(12) United States Patent
Kobayashi et al.

(10) Patent No.: US 8,342,358 B2
(45) Date of Patent: Jan. 1, 2013

(54) FUEL TANK DEVICE

(75) Inventors: Kazuhiro Kobayashi, Saitama (JP);
Takeaki Nakajima, Saitama (JP);
Shoichi Hokazono, Saitama (JP);
Shinya Murabayashi, Saitama (JP);
Yutaka Utsumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 616 days.

(21) Appl. No.: 12/069,904

(22) Filed: Feb. 12, 2008

(65) Prior Publication Data

US 2008/0190936 A1 Aug. 14, 2008

(30) Foreign Application Priority Data

Feb. 13, 2007 (JP) .................................. 2007-031519

(51) Int. Cl.
*B65D 88/12* (2006.01)

(52) U.S. Cl. ......................... 220/563; 220/4.14; 220/562

(58) Field of Classification Search ................. 220/4.12, 220/4.13, 4.14, 562, 563, 564, 555; 137/571, 137/574, 578, 582
See application file for complete search history.

(56) References Cited

U.S. PATENT DOCUMENTS

| | | | |
|---|---|---|---|
| 6,116,454 A * | 9/2000 | Henderson et al. ............ | 220/563 |
| 7,418,950 B2 * | 9/2008 | Teets et al. .................... | 123/509 |
| 2005/0115054 A1 * | 6/2005 | Brandner et al. ................ | 29/592 |
| 2006/0207991 A1 * | 9/2006 | Sugiura ......................... | 220/563 |

FOREIGN PATENT DOCUMENTS

| JP | 08-113044 A | 5/1996 |
|---|---|---|
| JP | 2884475 B2 | 4/1999 |
| JP | 2004-189074 | 7/2004 |

* cited by examiner

*Primary Examiner* — Anthony Stashick
*Assistant Examiner* — Jeffrey Allen
(74) *Attorney, Agent, or Firm* — Carrier Blackman & Associates, P.C.; William D. Blackman; Joseph P. Carrier

(57) ABSTRACT

A fuel tank includes a first fuel chamber for receiving liquid fuel; a communication chamber communicated with the first fuel chamber and having a bottom higher than a bottom of the first fuel chamber; and a second fuel chamber communicated with the communication chamber, the second fuel chamber having a bottom lower than the bottom of the communication chamber. The fuel tank also includes a sleeve member having a lower end opening toward the bottom of the communication chamber, and configured so that fuel evaporative emissions are discharged while liquid fuel is supplied to the first fuel chamber. The first fuel chamber, the communication chamber, and the second fuel chamber are all molded integrally by resin blow molding. The communication chamber is provided with a protrusion which is convex when viewed from inside the communication chamber, and a depression which is concave when viewed from outside of the communication chamber.

10 Claims, 6 Drawing Sheets

FUEL TANK DEVICE

CROSS REFERENCE TO RELATED APPLICATIONS

This application claims the foreign priority benefit under Title 35, United States Code, §119(a)-(d) of Japanese Patent Application No. 2007-31519, filed on Feb. 13, 2007 in the Japan Patent Office, the disclosure of which is herein incorporated by reference in its entirety.

BACKGROUND OF THE INVENTION

1. Field of the Invention

The present invention relates to a fuel tank device for storing liquid fuel.

2. Description of the Related Art

Conventionally, a fuel tank device having a float valve to close a breather pipe when a liquid level of liquid fuel having been supplied thereinto is raised to a certain level has been proposed (See JP2004-189074A).

The inside of the fuel tank device is filled with liquid fuel and fuel evaporative emissions generated by evaporation of the liquid fuel into air in the fuel tank device. Accordingly, when a volume of the liquid fuel inside the fuel tank device is increased by feeding the liquid fuel, the fuel evaporative emissions are discharged from the inside of the fuel tank device through the breather pipe. In a fuel tank device provided in a vehicle, the discharged fuel evaporative emissions are charged in a canister until the float valve is closed due to a fill-up when feeding the liquid fuel. The fuel evaporative emissions charged in the canister are purged and sucked from an engine intake system into an engine to be combusted after the engine starts.

The fuel tank device is often arranged under a seat or seats where it is relatively easy to secure a capacity, in the vehicle. In order to increase the capacity with the fuel tank device being arranged under the seat or the seats without interfering with the latter, a ground clearance is rendered as small as possible.

There are vehicles such as a front engine rear-wheel drive vehicle (an FR vehicle) where power of an engine placed in the front is transferred to a rear wheel via a propeller shaft. In such vehicles, too, the fuel tank device is arranged under a seat above a propeller shaft extending along the center of the vehicle not to interfere with the propeller shaft. In order that the fuel tank device does not interfere with the propeller shaft while the ground clearance of the fuel tank device is maintained as small as possible, a part of the bottom of the fuel tank device is raised. The propeller shaft is designed to be passed under the raised bottom. The fuel tank device is shaped into a so called saddle.

By being rendered a saddle, it is considered that the fuel tank device has a first fuel chamber located on one end thereof, a second fuel chamber located on the other end thereof and a raised bottom communication chamber communicating with the first fuel chamber through the second fuel chamber.

The fuel evaporative emissions need to be discharged from the fuel tank device while the liquid fuel is supplied. Therefore, the communication chamber is provided with the float valve to which the breather pipe is connected. The fuel evaporative emissions are discharged from the breather pipe. Even if a work floor in a filling station such as a gas station, etc., is slightly sloped so that a vehicle is slightly inclined, an appropriate filling amount can be secured by providing the float valve in the communication chamber. If the float valve is arranged in the first fuel chamber or the second fuel chamber, a filling amount varies in accordance with the inclination of the vehicle.

When filled, the liquid fuel is fed to the first fuel chamber via a filler pipe. From the first fuel chamber, the liquid fuel is fed to the second fuel chamber via the communication chamber. Since the communication chamber has a raised bottom, the height from the bottom to the float valve is forced to be low. Consequently, the liquid fuel flown from the first fuel chamber into the second fuel chamber can make contact with the float valve. As a result, the float valve is closed and the fuel evaporative emissions are not discharged so that an inner pressure is increased. The liquid level of the liquid fuel rises in the filler pipe. When the liquid level of the liquid fuel reaches the tip of a fuel nozzle, the fuel nozzle detects the liquid level and stops supplying the fuel. At this time, at least, the liquid fuel in the second fuel chamber does not reach a filled-up level. Therefore, an untimely automatic stop is made to occur. It is preferable to eliminate an occurrence of such an untimely automatic stop as much as possible in order to carry out a smooth filling operation.

SUMMARY OF THE INVENTION

A first aspect of the present invention provides a fuel tank device comprising: an integrally molded resin tank container comprising: a first fuel chamber including a bottom for receiving a liquid fuel from the outside; a communication chamber communicated with the first fuel chamber, having a bottom higher than the bottom of the first fuel chamber, for receiving the liquid fuel from the first fuel chamber; and a second fuel chamber communicated with the communication chamber, including a bottom lower than the bottom of the communication chamber, for receiving the liquid fuel from the communication chamber; and a sleeve member within the communication chamber, including an upper end exposed to the outside through an opening in the integrally molded resin tank container and a lower end opening facing the bottom of the communication chamber, for discharging fuel evaporative emissions of the liquid fuel through the lower end opening, wherein the communication chamber comprises a protrusion which is convex when viewed from the inside of the communication chamber and a corresponding depression which is concave when viewed from the outside of the communication chamber on a side of first fuel chamber relative to the sleeve member in the communication chamber.

Preferably, the liquid fuel flowing from the first fuel chamber into the second fuel chamber hits the protrusion directly, the protrusion changing the direction of the flow. Since the liquid fuel flows as if to go around and bypass the sleeve member, the liquid fuel flowing around the sleeve member can be reduced in a flow rate. As a result, the fuel evaporative emissions can be discharged without the gas passage being blocked by the liquid fuel. There is no occurrence that the liquid fuel enters the sleeve member while the fuel evaporative emissions are discharged through the sleeve member. Additionally, according to the present invention, the protrusion can be formed by forming a depression which is concave when viewed from the outside of the communication chamber. Consequently, the protrusion can be manufactured by resin blow molding which easily makes the thickness uniform.

A second aspect of the present invention provides the fuel tank device based on the first aspect, wherein the protrusion when viewed from the inside of the communication chamber has a shape of a crescent arranged so as to partially surround the sleeve member, and the crescent has a middle part on a side of the first fuel chamber relative to the sleeve member.

Accordingly, a strength sufficient to check the flow of the liquid fuel can be secured easily.

A third aspect of the present invention provides the fuel tank device based on the second aspect, wherein the crescent has a height from an inner surface of the communication chamber outside the crescent as a peak at the middle part thereof, where the peak is disposed at a first distance from a top wall panel of the communication chamber. The height of the crescent gradually becomes smaller with lateral distance from the peak, such that respective end portions of the crescent are disposed at a second distance from the top wall panel which is greater than the first distance.

Preferably, the liquid fuel flows separately to the left and right without having to check the liquid fuel. The direction of the flow of the liquid fuel can be changed easily thereupon to allow the liquid fuel to flow without hitting the sleeve member. In addition, since the protrusion may have a smooth three dimensional shape, the resin blow molding technique can be easily employed.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art (JP2004-189074A) will be further explained.

JP2004-189074A discloses a baffle plate preventing the liquid fuel from making contact with the float valve directly.

The baffle plate is provided in the inside of the fuel tank device. Therefore, it is necessary to insert and fix the baffle plate within the fuel tank device when the fuel tank device is manufactured. However, the insertion and fixing are difficult in resin blow molding.

In addition, a process of the liquid fuel flown from the first fuel chamber into the second fuel chamber making contact with the float valve thereby closing the latter was examined in detail. It was found that when the liquid fuel flown from the first fuel chamber into the second fuel chamber makes contact with the float valve, the liquid fuel blocked a gas passage where the fuel evaporative emissions were discharged. Consequently, the fuel evaporative emissions could not be discharged so that pressure was increased. The fuel evaporative emissions pushed up the blocking liquid fuel by way of discharging together with the liquid fuel. This pushing-up lifted up a float of the float valve. As a result, the float valve was closed. Therefore, it was considered advantageous, in order to eliminate an occurrence of an untimely automatic stop, to separate the gas passage where the fuel evaporative emissions are discharged so as not to be blocked by a liquid passage of the liquid fuel.

In view of the foregoing problems, it is an object of the present invention to provide a fuel tank device capable of eliminating an occurrence of an untimely automatic stop and being easily manufactured.

Next, embodiments of the present invention are described in detail with reference to the drawings as appropriate. In addition, components in common are denoted by the same numerals in each figure, and overlapped explanations are omitted.

First Embodiment

Figure 1:
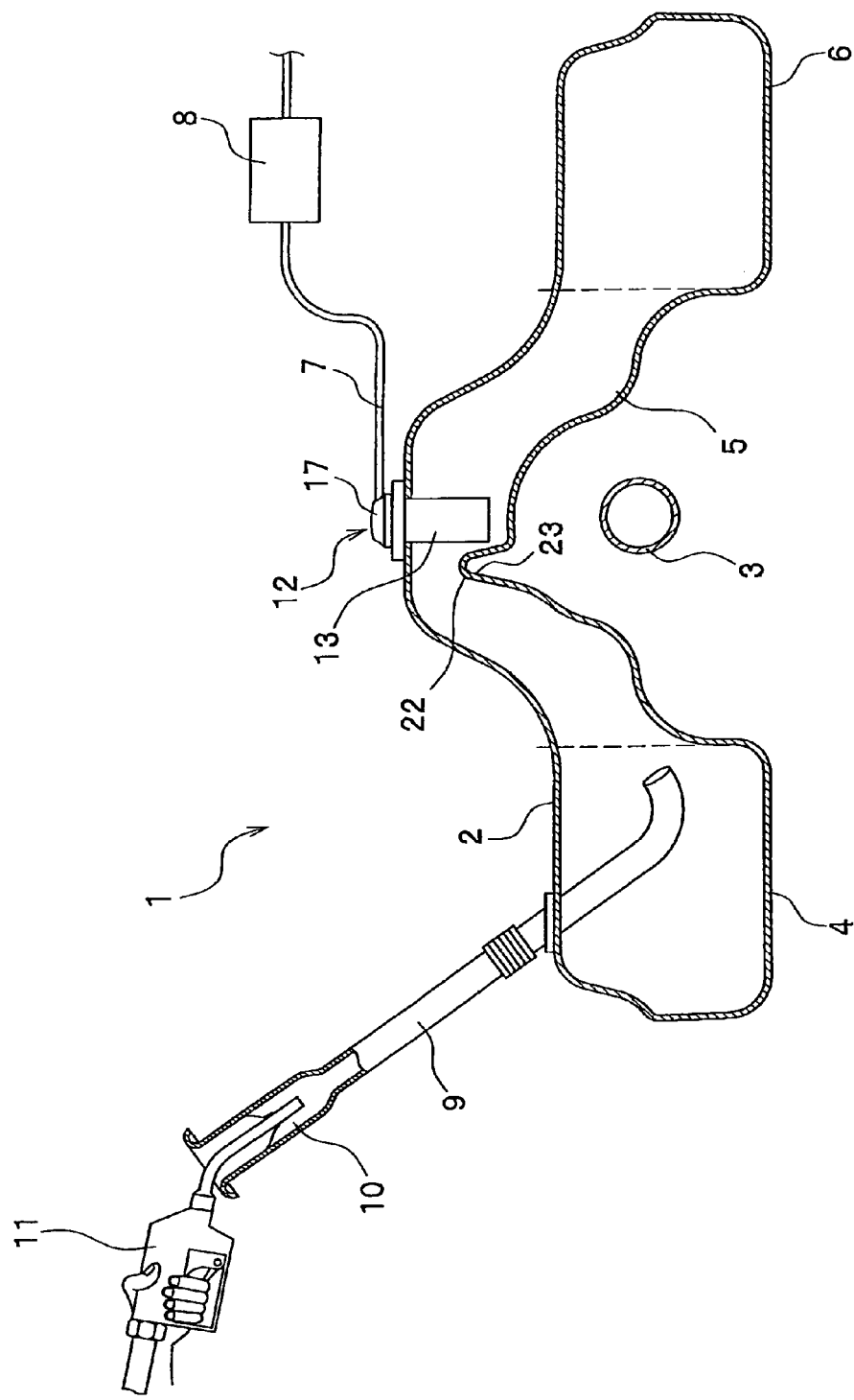
FIG. 1 is a sectional view of a fuel tank device of a first embodiment of the present invention.

FIG. 1 is a sectional view of a fuel tank device 1 in accordance with a first embodiment of the present invention. Since a propeller shaft 3 is arranged under a middle part of a tank container 2, the middle part has a raised bottom. The tank container 2 has a saddle shape as a whole. The saddle shape allows the tank container 2 to have both ends with low bottoms, so that a volume of the tank container 2 can be rendered large.

In other words, the saddle shaped tank container 2 has a first fuel chamber 4 located on one end, a second fuel chamber 6 located on the other end and a communication chamber 5 having a raised bottom communicating the first fuel chamber 4 with the second fuel chamber 6. The tank container 2 including the first fuel chamber 4, the communication chamber 5 and the second fuel chamber 6 is integrally molded by resin blow molding.

In the resin blow molding of the tank container 2, a laminated film is used. The laminated film is formed by laminating six layers of a polyethylene resin layer, a recycled layer, an adhesive layer, an ethylene-vinylalcohol copolymer resin layer, an adhesive layer and a polyethylene layer, in sequence from the outside to the inside. A permeation amount of the liquid fuel can be minimized by the ethylene-vinylalcohol copolymer resin layer. In addition, for the recycled layer, a film which is recycled from fins of the laminated film having been generated in the resin blow molding process is used.

A filler pipe 9 with an end as an oil filler port 10 is connected to the first fuel chamber 4. The liquid fuel can be supplied into the first fuel chamber 4 from a fuel nozzle 11 via the filler pipe 9.

The communication chamber 5 is communicated with the first fuel chamber 4 and has a higher bottom than that of the first fuel chamber 4. Therefore, when the liquid fuel is supplied into the first fuel chamber 4, the liquid fuel remains within the first fuel chamber if a liquid level of the liquid fuel is not higher than the bottom height of the communication chamber 5. On the other hand, the liquid fuel flows from the first fuel chamber 4 into the communication chamber 5 if the liquid level rises and becomes higher than the bottom height of the communication chamber 5. The communication chamber 5 also has a top wall panel 5t (FIG. 3) which is spaced away from the bottom of the communication chamber.

The second fuel chamber 6 is communicated with the communication chamber 5 and has a lower bottom than that of the communication chamber 5. Therefore, when the liquid fuel is supplied into the first fuel chamber 4 and then flows into the communication chamber 5, the liquid fuel is in turn flows from the communication chamber 5 into the second fuel chamber 6.

A float valve 12 is attached to a ceiling of the communication chamber 5. The float valve 12 is connected to a canister 8 via the breather pipe 7. The float valve 12 has a sleeve member 13 arranged inside the communication chamber 5. The float valve 12 has a head 17 arranged outside the communication chamber 5. An upper end of the sleeve member 13 is connectable to the outside (canister 8) via the head 17 and the breather pipe 7. A lower end of the sleeve member 13 opens toward the bottom of the communication chamber 5. The sleeve member 13 serves as an outer periphery of the float valve 12. A float (not shown) is housed inside the sleeve member 13. The upper end of the sleeve member 13 is connected to the canister 8 via the head 17 and the breather pipe 7.

While the liquid fuel is filled, the float valve 12 can discharge the fuel evaporative emissions having been generated by evaporation of the liquid fuel and accumulated within the tank container 2, into the canister 8 via the sleeve member 13 and the breather pipe 7 until the liquid level of the liquid fuel reaches a predetermined level. The canister 8 stores the fuel evaporative emissions. When the liquid level of the liquid fuel is raised to the predetermined level, this elevates the float synchronously, which blocks the connection from the sleeve member 13 to the canister 8, regarded as a fill-up. A pressure within the tank container 2 increases after the blockage. The liquid level of the liquid fuel rises in the filler pipe 9. When the liquid level of the liquid fuel reaches the tip of the filler nozzle 11, the filler nozzle 11 detects the liquid-level and stops filling. The fuel evaporative emissions are accumulated in the canister 8 until the float valve is closed due to the fill-up. The fuel evaporative emissions stored in the canister 8 are sucked from an engine intake system to an engine to be combusted after the engine starts.

The communication chamber 5 is formed with an integral protrusion 22 extending upwardly thereon, the protrusion formed by an indentation of a portion of the tank wall and configured to be convex when viewed from the inside of the communication chamber 5. The indentation of the tank wall forming the protrusion 22 also defines a corresponding depression 23 which is concave when viewed from a vantage point outside of the communication chamber 5, on the bottom thereof and on the first fuel chamber 4 side relative to the sleeve member 13 in the communication chamber 5. As shown best in FIGS. 1 and 4, the protrusion 22 is provided in the communication chamber 5 adjacent the sleeve member 13 at a location configured to substantially shield the sleeve member 13 from direct contact by a turbulent flow of liquid fuel entering the tank 2 during a tank filling operation, until a fuel level in the entire tank reaches the lower end of the sleeve member.

According to the protrusion 22, the liquid fuel flowing from the first fuel chamber 4 into the second fuel chamber 6 directly hits the protrusion 22, whereupon a direction of the flow is changed. The liquid fuel flows as if to go around and bypass the sleeve member 13 of the float valve 12. Therefore, the liquid fuel flowing around the sleeve member 13 can be reduced in a flow rate. As a result, the fuel evaporative emissions can be discharged without the opening of the lower end of the sleeve member 13 being blocked by the liquid fuel. This prevents the liquid fuel from entering the sleeve member 13 with discharge of the fuel evaporative emissions. This prevents the float from being pushed up while the fuel evaporative emissions are discharged through the sleeve member 13.

Additionally, the protrusion 22 can be formed by forming the depression 23 which is concave when viewed from the outside of the communication chamber 5. Consequently, the protrusion 22 can be easily manufactured by resin blow molding which easily makes the thickness of the tank container 2 uniform.

Figure 2:
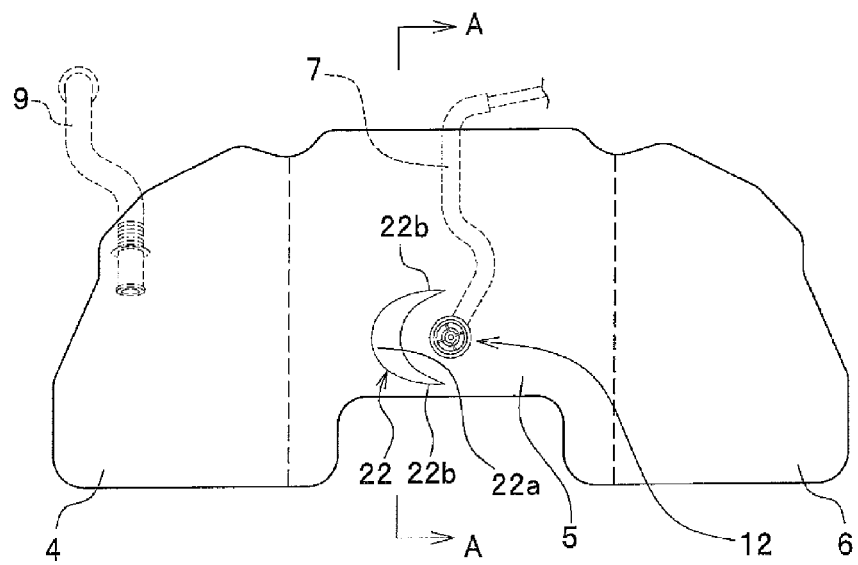
FIG. 2 is a top view showing a bottom of the fuel tank device of the first embodiment of the present invention.

As shown in FIG. 2, the shape of the protrusion 22 when viewed from the top surface is a crescent arranged so as to partially surround the float valve 12 including the sleeve member 13, etc. A middle part 22a of the crescent is arranged on the first fuel chamber 4 side in the float valve 12. In addition, the crescent is arranged such that a straight line connecting both ends 22b of the crescent becomes in parallel to the axial direction of the propeller shaft 3 (see FIG. 1). With the crescent, a strength sufficient to check the flow of the liquid fuel from the first fuel chamber 4 to the second fuel chamber 6 can be easily secured.

Figure 3:
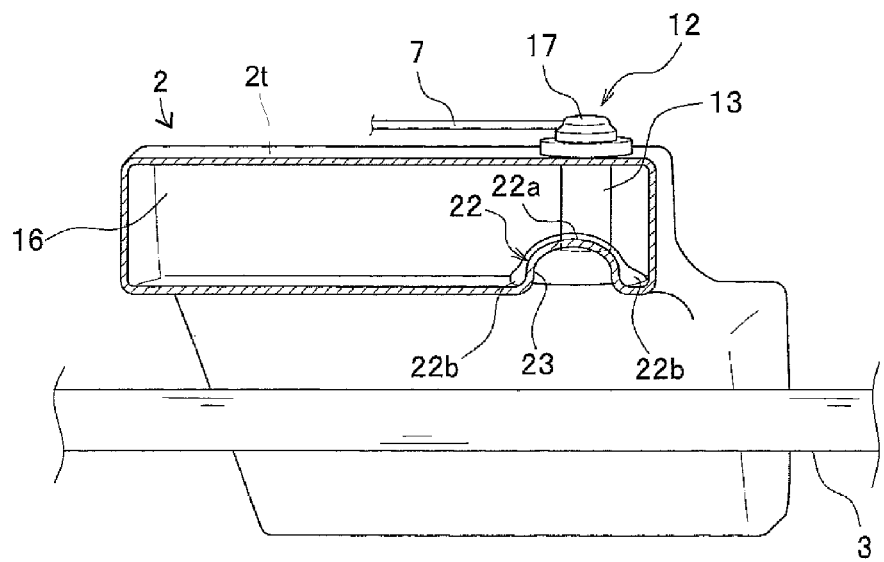
FIG. 3 is a sectional view taken along A-A in FIG. 2.

In the crescent of the protrusion 22, as shown in FIG. 3, the middle part 22a forms a peak at the highest part thereof, where the peak is disposed at a first distance from the top wall panel 2t of the communication chamber 5. The height of the crescent gradually becomes lower with distance from the peak of the middle part 22a, such that respective end portions of the crescent are disposed at a second distance from the top wall panel which is greater than the first distance. The far ends 22b of the crescent have the same height as a bottom outside the crescent. Accordingly, the liquid fuel can flow to the left and right of the middle part 22a without having to be checked. As a result, the direction of the flow of the liquid fuel can be changed easily to flow the liquid fuel without making contact with the sleeve member 13. Additionally, the protrusion 22 has a smooth three-dimensional shape. Therefore, the resin blow molding technique can be easily employed.

The protrusion 22 is higher than the lower end of the sleeve member 13 from the bottom of the communication chamber 5 other than the protrusion 22. As a result, the flow of the liquid fuel which conventionally makes contact with the sleeve member 13 directly and blocks the opening of the lower end of the sleeve member 13 can be checked without fail, thereupon enabling to flow the liquid fuel by changing the direction.

Next, an operation where the fuel tank device 1 having the protrusion 22 is filled with fuel is described.

Figure 4:
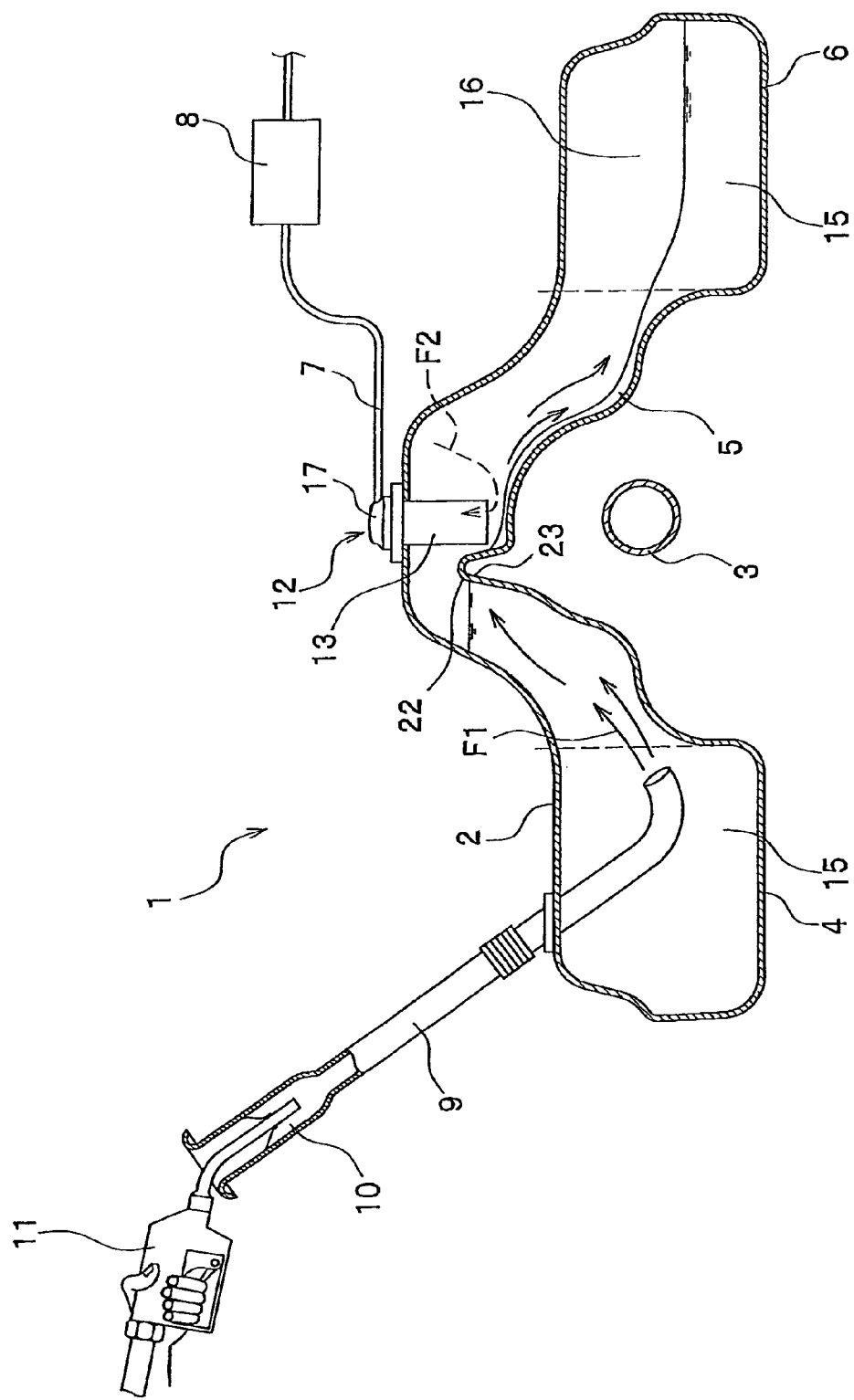
FIG. 4 is a sectional view showing flows of liquid fuel and fuel evaporative emissions generated in the fuel tank device of the first embodiment of the present invention.

As show in FIG. 4, the liquid fuel 15 is supplied to the first fuel chamber 4 via the filler pipe 9 by use of the filler nozzle 11. The liquid fuel 15 remains only in the first fuel chamber 4 when the liquid level of the liquid fuel 15 is not higher than the bottom height of the communication chamber 5. However, the liquid fuel 15 flows from the first fuel chamber 4 into the communication chamber 5 and the second fuel chamber 6 when the liquid level rises and becomes higher than the bottom height of the communication chamber 5. At this moment, a liquid passage F1 in a direction from the first fuel chamber 4 to the second fuel chamber 6 is formed by the liquid fuel 15. The protrusion 22 can be check the liquid passage F1 so that the liquid fuel 15 flowing around the sleeve member 13 can be reduced in a flow rate. Therefore, the fuel evaporative emissions 16 can be discharged without the opening of the lower end of the sleeve member 13 being blocked by the liquid fuel 15. More specifically, a gas passage F2 where the fuel evaporative emissions 16 are discharged is separated from the opening of the lower end of sleeve member 13 so as not to be blocked by the liquid passage F1 of the liquid fuel 15. This prevents the float from being pushed up as a result of the liquid fuel 15 being sucked and entering the sleeve member 13 while the fuel evaporative emissions 16 are discharged through the sleeve member 13. Therefore, an untimely automatic stop does not occur.

Figure 5:
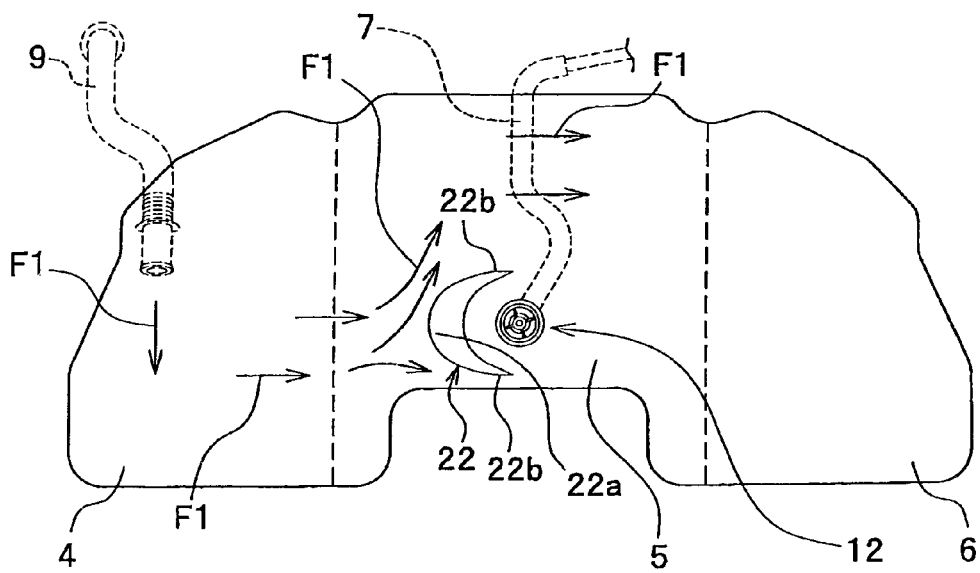
FIG. 5 is a top view of the bottom showing a flow of the liquid fuel generated in the fuel tank device of the first embodiment of the present invention.
Figure 6:
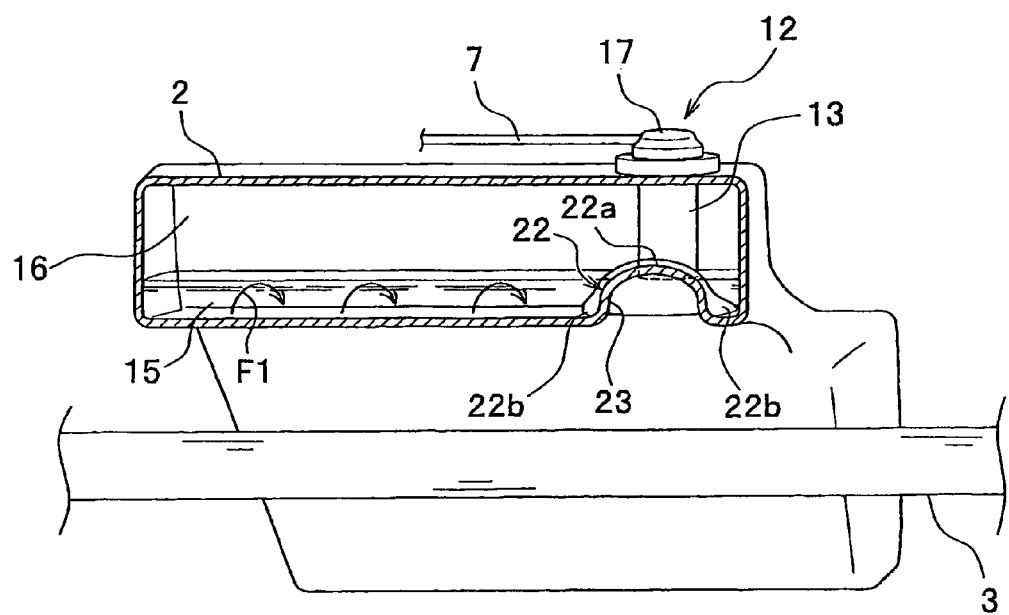
FIG. 6 is a sectional view taken along A-A in FIG. 2, showing a flow of the liquid fuel generated in the fuel tank device of the first embodiment of the present invention.

As shown in FIGS. 5 and 6, the liquid fuel 15 having been checked by the protrusion 22 flows as forming a new liquid passage F1 separated on either side of the protrusion 22. Since the liquid passage F1 flows along the protrusion 22, the liquid fuel 15 bypasses the sleeve member 13 and does not make contact with the sleeve member. This also prevents the opening of the lower end of the sleeve member 13 from being blocked by the liquid fuel 15. Consequently, an untimely automatic stop does not occur.

Second Embodiment

Figure 7:
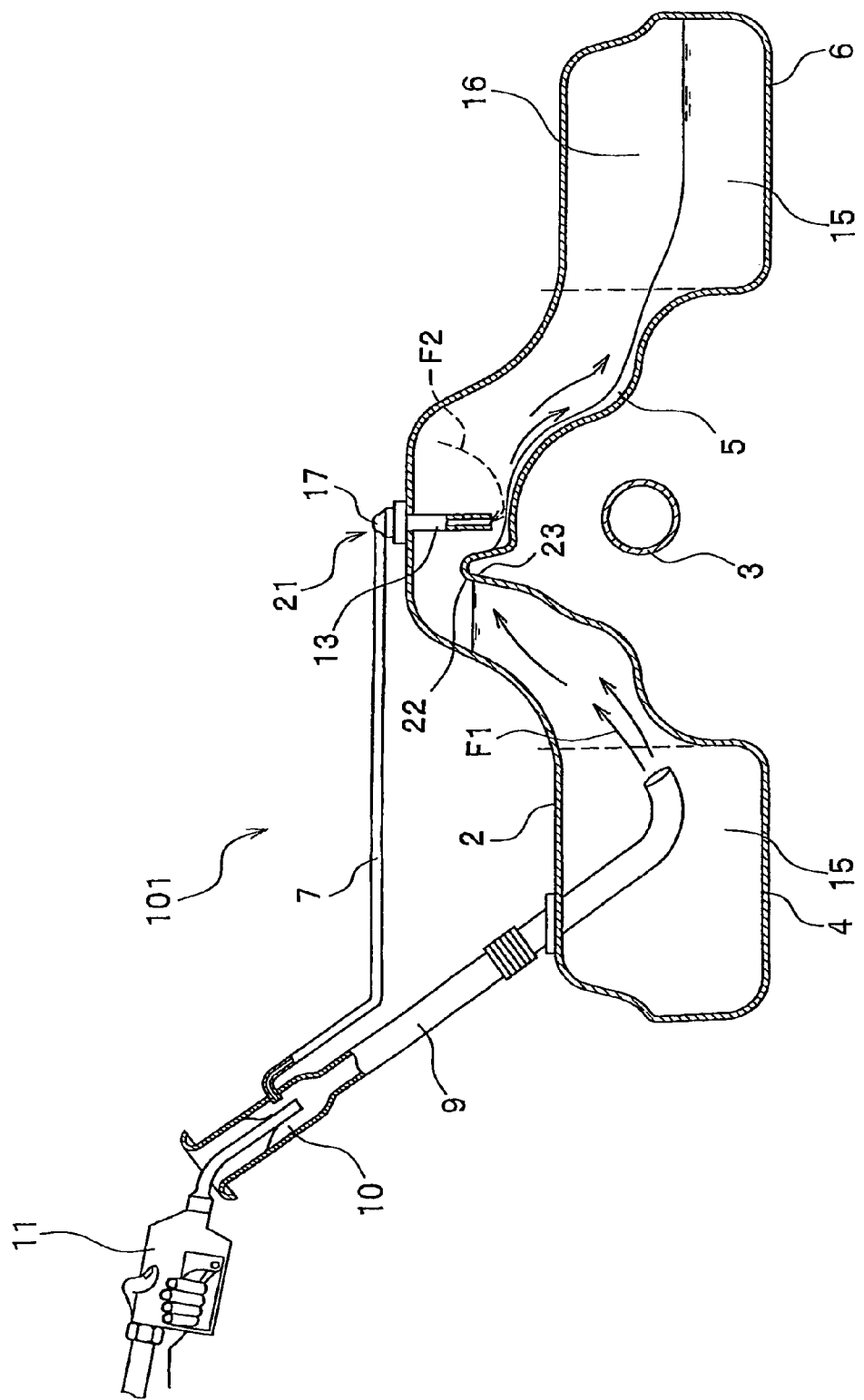
FIG. 7 is a sectional view of a fuel tank device of a second embodiment of the present invention.

FIG. 7 is a sectional view of a fuel tank device 1 of a second embodiment of the present invention. A difference of the fuel tank device 101 of the second embodiment from the fuel tank device 1 of the first embodiment is in that the float valve 12 is replaced with a joint 21. The joint 21 connects the communication chamber 5 with the breather pipe 7. The breather pipe 7 is connected to the filler pipe 9 which supplies the first fuel chamber 4 with the liquid fuel 15. In addition, the joint 21 includes a sleeve member 13 for discharging the fuel evaporative emissions 16.

According to the second embodiment, when the liquid fuel is filled, the fuel evaporative emissions 16 are discharged from the fuel tank device 1 through the communication chamber 5, the joint 21, the breather pipe 7 and the filler pipe 9 (oil filler port 10) in sequence until a fill-up. When the liquid level of the liquid fuel 15 reaches the opening of the lower end of the sleeve member 13 so that the tank is filled-up, the liquid level of the liquid fuel 15 rises as passing through the communication chamber 5, the joint 21, the breather pipe 7 and the filler pipe 9 (oil filler port 10) in sequence, thereafter reaching the tip of the filler nozzle 11. The filler nozzle 11 detects the liquid level and filling can be stopped. The height of the opening of the lower end of the sleeve member 13 determines the capacity of the tank container 2 when filled-up. Therefore, the sleeve member 13 is intended to exist to no small extent in order to adjust the height. When filling, the protrusion 22 checks the liquid passage F1, thereby enabling to flow the liquid passage F1 as bypassing the sleeve member 13. As a result, the liquid fuel 15 flowing around the sleeve member 13 can be reduced. Accordingly, the opening of the lower end of sleeve member 13 is not blocked by the liquid fuel 15 so that the fuel evaporative emissions 16 can be discharged. More specifically, the gas passage F2 where the fuel evaporative emissions 16 are discharged is separated from the opening of the lower end of the sleeve member 13 so as not to be blocked by the liquid passage F1 of the liquid fuel 15. Consequently, this prevents the liquid fuel 15 from being pushed up, entering the sleeve member 13, and entering the oil filler port 10 while the fuel evaporative emissions 16 are discharged through the sleeve member 13. Therefore, an untimely automatic stop does not occur.

Additionally, the protrusion 22 can be formed by forming the depression 23 which is concave when viewed from the outside of the communication chamber 5. As a result, the protrusion 22 can be easily manufactured by resin blow molding which easily makes the thickness of the tank container 2 uniform.

Third Embodiment

Figure 8:
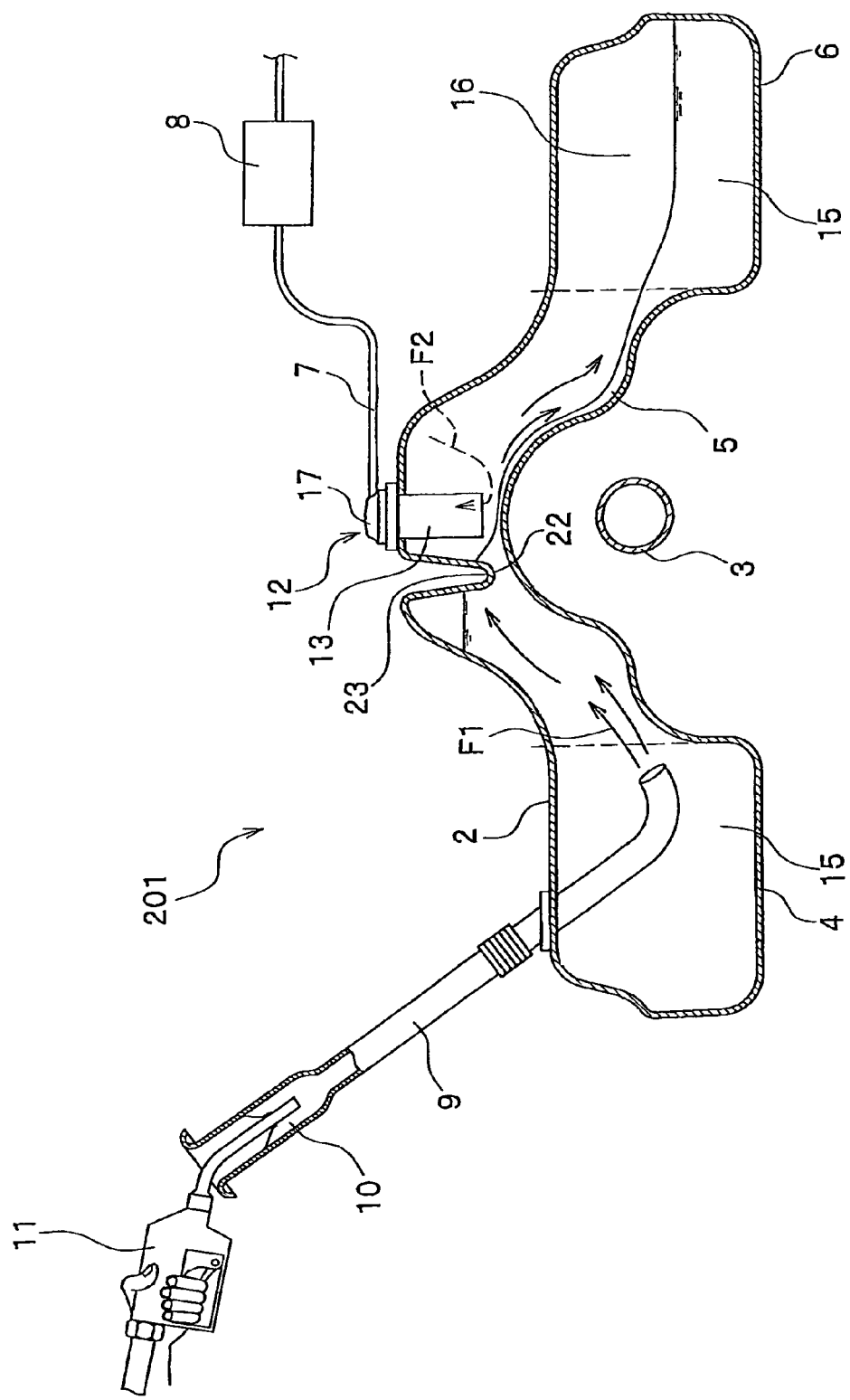
FIG. 8 is a sectional view of a fuel tank device of a third embodiment of the present invention.

FIG. 8 is a sectional view of a fuel tank device 201 of a third embodiment of the present invention. A difference of the fuel tank device 201 of the third embodiment from the fuel tank device 1 of the first embodiment is in that the protrusion 22 and the depression 23 are formed on the ceiling of the communication chamber 5. More specifically, the protrusion 22 which is convex when viewed from the inside of the communication chamber 5 or the depression 23 which is concave when viewed from the outside of the communication chamber 5 is formed on the ceiling of the communication chamber 5 on the first fuel chamber 4 side relative to the sleeve member 13 in the communication chamber 5.

The liquid fuel flowing from the first fuel chamber 4 into the second fuel chamber 6 hits the protrusion 22 directly so that the direction of the flow is changed in the same manner as the first embodiment. The liquid fuel flows as if to go around and bypass the sleeve member 13 constituting the float valve 12. As a result, the liquid fuel flowing around the sleeve member 13 can be reduced in the flow rate. Accordingly, the fuel evaporative emissions can be discharged without the opening of the lower end of the sleeve member 13 being blocked by the liquid fuel. More specifically, the gas passage F2 where the fuel evaporative emissions 16 are discharged is separated from the opening of the lower end of the sleeve member 13 so as not to be blocked by the liquid passage F1 of the liquid fuel 15. This prevents the liquid fuel from entering into the sleeve member 13 by the fuel evaporative emissions, which also prevent the liquid fuel pushing up the float while the fuel evaporative emissions are discharged through the sleeve member 13. Consequently, an untimely automatic stop does not occur.

Additionally, the protrusion 22 can be formed by forming the depression 23 which is concave when viewed from the outside of the communication chamber 5. As a result, the protrusion 22 can be easily manufactured by resin blow molding which easily makes the thickness of the tank container 2 uniform.

The invention claimed is:

1. A saddle-shaped fuel tank device comprising:
   an integrally molded resin fuel tank container comprising:
   a first fuel chamber including a bottom for receiving a liquid fuel from the outside, the first fuel chamber located at one end of the fuel tank container in a width direction of a vehicle;
   a communication chamber communicated with the first fuel chamber, the communication chamber having a bottom disposed higher than the bottom of the first fuel chamber and also having a top wall panel spaced away from the bottom of the communication chamber, wherein the communication chamber is configured for receiving the liquid fuel from the first fuel chamber; and
   a second fuel chamber communicated with the communication chamber, including a bottom lower than the bottom of the communication chamber, for receiving the liquid fuel from the communication chamber, the second fuel chamber located at the other end of the fuel tank container in the width direction of the vehicle; and
   a sleeve member within the communication chamber, including an upper end exposed to the outside through an opening in the top wall panel of the integrally molded resin tank container and a lower end opening facing the bottom of the communication chamber, for discharging fuel evaporative emissions of the liquid fuel through the lower end opening,
   wherein the communication chamber comprises a protrusion which is convex when viewed from the inside of the communication chamber and wherein the protrusion further defines a corresponding depression which is concave when viewed from the outside of the communication chamber, the depression situated on a side of the communication chamber adjacent the first fuel chamber relative to the sleeve member, wherein the protrusion when viewed from the inside of the communication chamber has a shape of a crescent arranged so as to partially surround the sleeve member, and the crescent has a middle part on the side of the communication chamber adjacent the first fuel chamber relative to the sleeve member, wherein the crescent is spaced away from side walls of the fuel tank container in the longitudinal direction of the vehicle, wherein the crescent has a peak at the middle part thereof, said peak disposed at a first distance from the top wall panel of the communication chamber, wherein the middle part of the crescent is seen overlapping a central portion of the sleeve member when viewed in the width direction of the vehicle, and the height of the crescent gradually becoming smaller with distance from the peak such that respective end portions of the crescent are disposed at a second distance from the top wall panel which is greater than said first distance.

2. The fuel tank device according to claim 1, further comprising a check valve for opening and closing an opening of the sleeve member on a side of the fuel tank.

3. The fuel tank device according to claim 1, wherein the protrusion is formed in the bottom of the communication chamber.

4. The fuel tank device according to claim 1, wherein the protrusion is formed in the ceiling of the tank in the communication chamber.

5. The fuel tank device according to claim 1, wherein the protrusion and the tank are integrally molded by resin blow molding, and wherein the tank wall is of substantially uniform thickness throughout a cross-sectional area thereof.

6. The fuel tank device according to claim 1, wherein the tank comprises a laminated film comprising a plurality of layers.

7. The fuel tank device according to claim 6, wherein the laminated film comprises six layers comprising a polyethylene resin layer, a recycled layer, an adhesive layer, an ethylene-vinylalcohol copolymer resin layer, an adhesive layer and a polyethylene layer, arranged in an order from outside to inside.

8. The fuel tank device according to claim 1, wherein the fuel tank is configured and arranged such that during said filling operation, the protrusion substantially prevents blockage of the opening in the lower end of the sleeve by liquid fuel until the both of the fuel chambers of the tank are filled, thereby enabling evaporative emissions to be discharged through the sleeve member.

9. The fuel tank device according to claim 1, wherein the protrusion has a smooth three-dimensional shape.

10. The fuel tank device according to claim 1, wherein a central portion of the protrusion is higher than the lower end of the sleeve member.

* * * * *